(12) United States Patent
Campos et al.

(10) Patent No.: US 9,334,172 B2
(45) Date of Patent: May 10, 2016

(54) METHOD FOR RECOVERING VOLATILE COMPONENTS FROM A SOLID

(71) Applicants: Fraunhofer-Gesellschaft zur Förderung der angewandten Forschung e.V., München (DE); Universität Stuttgart, Stuttgart (DE)

(72) Inventors: Alejandra Campos, Stuttgart (DE); Siegfried Egner, Adelsheim (DE); Alexander Lohner, Stuttgart (DE); Sukhanes Laopeamthong, Stuttgart (DE); Maria Soledad Stoll, Marktheidenfeld (DE)

(73) Assignees: Fraunhofer-Gesellschaft zur Föderung der angewandten Forschung e. V., München (DE); Universität Stuttgart, Stuttgart (DE)

(*) Notice: Subject to any disclaimer, the term of this patent is extended or adjusted under 35 U.S.C. 154(b) by 0 days.

(21) Appl. No.: 14/702,944

(22) Filed: May 4, 2015

(65) Prior Publication Data
US 2016/0016808 A1    Jan. 21, 2016

Related U.S. Application Data

(63) Continuation of application No. 13/806,268, filed as application No. PCT/EP2011/060493 on Jun. 22, 2011, now abandoned.

(30) Foreign Application Priority Data

Jun. 22, 2010  (DE) .......................... 10 2010 025 206

(51) Int. Cl.
*C01C 1/02* (2006.01)
*B01D 3/14* (2006.01)
(Continued)

(52) U.S. Cl.
CPC ... *C01C 1/02* (2013.01); *B01D 3/14* (2013.01); *B01D 3/38* (2013.01); *B01D 9/00* (2013.01); *C01C 1/08* (2013.01); *F26B 25/006* (2013.01); *B01D 53/1418* (2013.01); *F26B 2200/12* (2013.01)

(58) Field of Classification Search
None
See application file for complete search history.

(56) References Cited

U.S. PATENT DOCUMENTS

| 1,025,622 A | 5/1912 | Grossmann |
| 5,613,452 A * | 3/1997 | Marchesi ............ B09B 3/0091 110/215 |
| 2004/0213713 A1* | 10/2004 | Shimamura .......... B01D 9/0036 422/245.1 |

FOREIGN PATENT DOCUMENTS

WO    97/00229    1/1997

*Primary Examiner* — Duane Smith
*Assistant Examiner* — Phillip Shao
(74) *Attorney, Agent, or Firm* — Gudrun E. Huckett

(57) ABSTRACT

In a method for recovering volatile components from a solid material, a liquid phase is mechanically removed from the solid material. Subsequently, the solid material is dried by exposing the solid material to superheated steam circulating in a closed circuit. From the closed circuit excess steam that contains volatile components given off by the solid material is removed. The volatile components are separated from the excess steam by condensing the excess steam to a condensed phase and the volatile components are from the condensed phase by adding suitable ions to the condensed phase to crystallize the volatile components.

3 Claims, 5 Drawing Sheets

(51) Int. Cl.
B01D 3/38 (2006.01)
B01D 9/00 (2006.01)
C01C 1/08 (2006.01)
F26B 25/00 (2006.01)
B01D 53/14 (2006.01)

METHOD FOR RECOVERING VOLATILE COMPONENTS FROM A SOLID

CROSS-REFERENCE TO RELATED APPLICATIONS

This application is a continuation application of U.S. patent application Ser. No. 13/806,268, which is a national stage filing of international application No. PCT/EP2011/060493 and has a 35 U.S.C. 371 completion date of 23 Feb. 2013, said international application having an international filing date of 22 Jun. 2011 and designating the United States, said international application claiming a priority date of 22 Jun. 2010, based on prior filed German patent application No. 10 2010 025 206.9, the entire contents of the aforesaid United States patent application, of said international application, and of said German patent application being incorporated herein by reference.

BACKGROUND OF THE INVENTION

The present invention concerns a method for recovering volatile components from excess steam when drying with superheated steam.

In conventional drying processes, for example, convection drying of moist biomass by means of warm or hot air, valuable volatile components such as flavor compounds are lost through the exhaust air.

When storing solid or liquid organic residual materials such as liquid manure or dung, ammonia is lost by evaporation. This is undesirable for several reasons. First of all, ammonia is an important raw material whose synthetic production is very energy-intensive. Secondly, ammonia is an air pollutant and is a health hazard at higher concentrations.

Similar problems arise in case of digestates which are remaining as liquid or solid residues upon fermentation of biomass for biogas production. Ammonium is not decomposed during fermentation. A great proportion of nitrogen of the substrate remains in the digestate. As a result of the decomposition processes, the proportion of the organic soluble nitrogen is shifted toward ammonium so that during anaerobic decomposition the proportion of ammonium will even increase. Ammonium nitrogen is present in aqueous solutions, depending on the pH value and temperature, as ammonium ion or as ammonia. When storing and discharging the digestates there is thus an increased danger of ammonia outgassing. When drying digestates with conventional drying methods, ammonia emissions are also produced.

WO 2009/018997 A1 discloses a method for separation of volatile substances, in particular flavoring compounds. In this connection, the excess steam is passed into a single-stage condenser and is liquefied therein. The resulting liquid is then further passed into an extraction device in order to separate the volatile components from the condensed water. By centrifugal and gravitational forces the light and volatile compounds pass into the gas phase and collect at the upper part of the device. By means of an inert gas, for example, steam (saturated steam), they are entrained and then passed into a condenser. There they are cooled and concentrated. On the other hand, water is thereby moving downward and is separated there.

The thermal water removal from the solid material is realized by drying with superheated water steam in a circulation method at atmospheric pressure. During drying the moisture contents of the solid material passes into the gas phase. This moisture that has been absorbed from the solid material becomes excess steam which is then to be discharged from the drying chamber as a result of volume increase of the gas in the closed circuit.

The invention has the object to provide an improved method for recovery of volatile components from a solid material.

SUMMARY OF THE INVENTION

The method according to the invention has the advantage that the excess steam must not be first completely condensed and the volatile components subsequently separated in a complex fashion by another pass into the gas phase, but the separation of the volatile components is done directly from the gas phase. Accordingly, the energy-intensive method step of another evaporation is eliminated.

Moreover, it is proposed that the separation of the volatile components is realized by rectification. With this thermal method it is possible in a simple way, i.e., by suitable selection of the parameters pressure and/or temperature, to separate several volatile components simultaneously and separate from each other from the gas phase and to recover them as recyclable materials by multi-stage condensation in one method step.

One embodiment of the method according to the invention provides that the separation of the volatile components from the gas phase is realized by scrubbing. A scrubber is a constructively simple method-technological apparatus and therefore can be installed with minimal apparatus expenditure and inexpensively.

A further embodiment of the method according to the invention resides in that the gas phase is condensed and the separation of volatile components is realized by crystallization by adding suitable ions. Suitable ions are primarily those that with the volatile components form in a chemical reaction a sparingly soluble salt. For example, ammonia that reacts with concentrated sulfuric acid to ammonium sulfate. The thus obtained salt can be used as a fertilizer for soils poor in nitrogen.

Conceivable is however also an addition of ions that shift a phase equilibrium such that the component dissolved in the liquid phase precipitates by crystallization as a solid material. This solid material can subsequently be separated by a simple mechanical (separation) method.

The method according to the invention works even better when the liquid phase is separated by a mechanical method before drying with superheated water steam. Free surface water can be separated from solid materials by very simple mechanical methods such as sedimentation, filtration or decanting. The energy expenditure is significantly less than in thermal separation by evaporation. The more moisture can be removed from the solid material before thermal drying with superheated water steam, the smaller the energy consumption for drying. A mechanical pre-dewatering action reduces the costs of drying with superheated steam.

Advantageously, it is proposed that the method according to the invention is used for recovery of ammonia from organic solids. The dried solid material can be advantageously used as a source of different nutrients, for example, phosphorus, potassium, calcium and, as a result of the proportion of organic substance, as a soil improving agent. By removal of water and the volume reduction that is caused thereby, the quantity of organic residual materials to be stored and to be transported is significantly reduced. Accordingly, storage and transport costs are saved. Moreover, when drying with process temperatures of more than 100 degrees Celsius, germs in organic residual materials can be killed off.

With the method according to the invention, in an advantageous way ammonia is separated from organic solid materials. Accordingly, emissions of ammonia and thus odor nuisance during storage or discharge onto the soil, as in the case of liquid manure, dung, digestates and sewage sludge, are significantly reduced.

The method according to the invention operates even better when the solid materials of organic origin are subjected to a biological, preferably anaerobic, pretreatment. In anaerobic decomposition processes, for example, digestion or fermentation, the major proportion of nitrogen contained in the substrate remains in the digestate. As a result of the decomposition processes the proportion of organically dissolved nitrogen is shifted to ammonia. With the method according to the invention, the ammonia is separated from the solid material so that the latter constitutes a phosphate-rich fertilizer.

The targeted recovery of ammonia by the method according to the invention enables the separate recovery of nitrogen-rich mineral fertilizer. Accordingly, in case of fertilizers a suitable hydrogen to phosphate ratio can be adjusted which is advantageously matched to the demand of the plants and to the soil composition and therefore prevents over-fertilization.

Further advantages and advantageous embodiments can be taken from the following drawings, their description, and the claims. All features disclosed in the drawings, the description and the claims can be important for the invention individually as well as in any suitable combination with each other.

DESCRIPTION OF PREFERRED EMBODIMENTS

Figure 1:
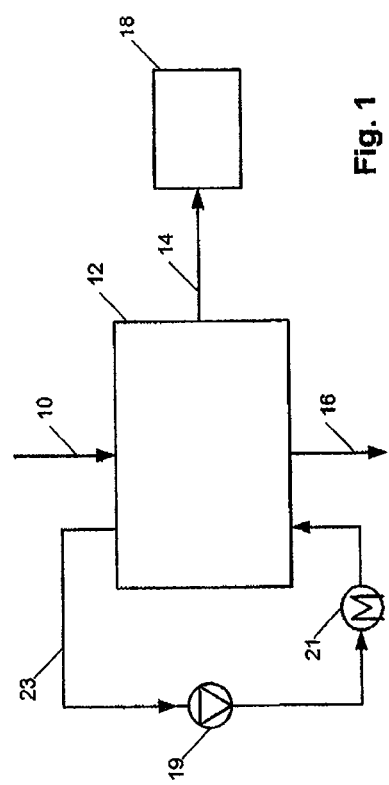
FIG. 1 the combination according to the invention of drying with superheated steam and separation of the volatile components contained in the steam.

FIG. 1 shows the combination of drying and subsequent separation of the volatile components. Solid materials 10 are supplied to a drying process with superheated water steam 10. The material to be dried is exposed to an atmosphere of water steam with a temperature above the boiling temperature (superheated water steam), is heated and releases its moisture in the form of water vapor into the atmosphere of superheated water steam which by means of ventilators 19 is circulated in a closed circuit 23.

The superheated water steam, temperature of more than 120 degrees Celsius at atmospheric pressure, takes up the moisture and cools down in doing so as a result of release of evaporation heat. This heat is returned to the water steam by a heating device 21 so that a nominal temperature is maintained and a further water absorption is possible. Together with the moisture also volatile components of the solid materials pass into the gas phase. The dried solid material 16 remains behind.

The moisture from the solid material 10 that has been absorbed becomes excess steam 14 that must be removed from the closed circuit in order to avoid volume increase of the superheated water steam 12.

In a further method step 18 the volatile components are separated from the excess steam 14. Possible processes that are encompassed by the method step 18 will be explained in more detail with the aid of FIGS. 4-6.

Figure 2:
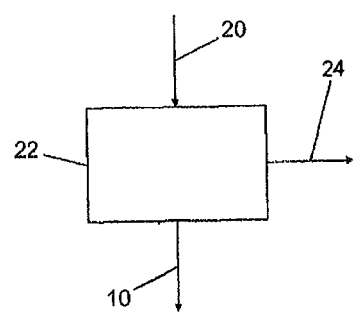
FIG. 2 a process upstream of the drying process for removing a liquid phase.

In FIG. 2 a pre-treatment for a mixture 20 of liquid and solid materials is illustrated. Before drying with superheated steam 12, free liquid is removed by means of a suitable mechanical method for solid/liquid separation 22 from the solid materials 10 that subsequently are to be dried. Suitable mechanical methods are, for example, filtration, sedimentation, decanting etc. The liquid phase 24 that is separated in this way is subjected to a conventional further treatment that is not illustrated in the Figures.

Figure 3:
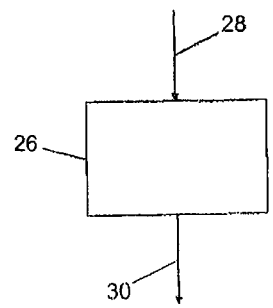
FIG. 3 a biological decomposition process upstream of the drying process.

The process 26 that is illustrated in FIG. 3 comprises a biological pre-treatment that is employed for residual materials of organic origin 28. Preferably anaerobic processes 26 are used, such as fermentation of biomass for biogas production or digestion of sewage sludge. By anaerobic processes 26 the organically bonded nitrogen is transformed into ammonium which is not decomposed by fermentation and therefore accumulates in the digestates 30. The digestates 30 of the biological pre-treatment form a mixture 20 of liquid and solid materials that are subjected to the solid/liquid separation 22 described in FIG. 2 before the solid materials 20 of the digestates 30 are subjected to drying with superheated steam 12.

Figure 4:
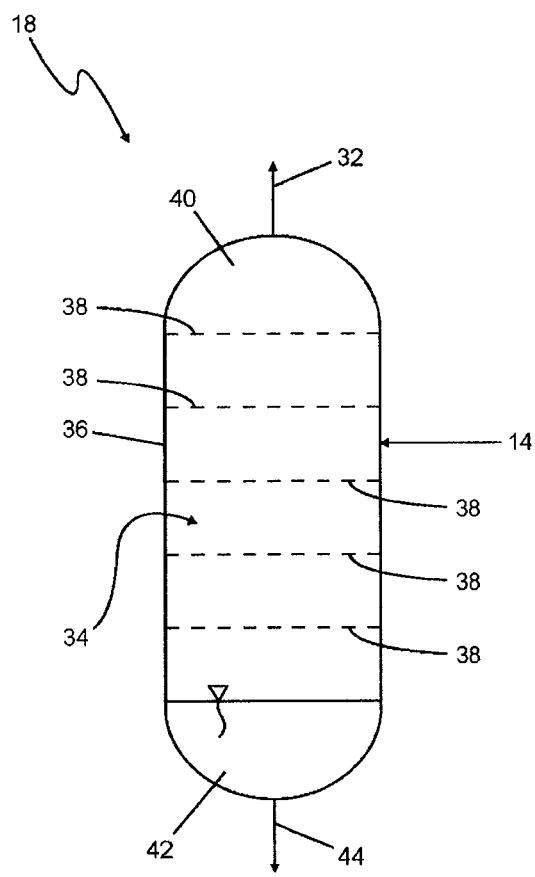
FIG. 4 a first variant according to the invention for separating the volatile components contained in the steam.

As a possible variant of the method step 18 according to the invention for separating volatile components 32 from the gas phase 14, FIG. 4 shows a fractioned condensation, a so-called rectification. In this thermal separation method, the fact is taken advantage of that for evaporation of a liquid mixture the concentrations of the individual materials in the gas and the liquid phase are determined by temperature and pressure and a phase equilibrium will be adjusted for a sufficiently long contact of gas and liquid. The rectification can be done within a column or by connecting in series several condensers.

FIG. 4 shows a rectification column 34 that comprises a cylindrical container 36 with inserts that intensify heat and material exchange. The inserts can be in the form of a packing, bulk filler bodies, or plates 38, as illustrated in the Figure. The gas phase 14 is introduced at a location of the rectification column 34 where a phase equilibrium exists that corresponds to that of the gas phase 14. Liquid standing on the plate 38 condenses from the gas phase 14 a mixture of a concentration of volatile components in accordance with the existing phase equilibrium. The released condensation heat evaporates at the same time a mixture with higher concentration of volatile components 32 which, in turn, through the openings of the plate 38 will flow into the liquid standing thereon. Toward the head 40 the volatile components 32 will accumulate and can be removed thereat while the higher boiling components are returned. In the sump 42 the higher boiling component 44 accumulates and can be removed therefrom.

For a suitable process control, in particular adjustment of the pressure and temperature ratios in the rectification column 34 at any of the plates 38 that component of the supplied gas phase 14 can be removed whose boiling temperature corresponds to the temperature that exists at the plate 38.

Figure 5:
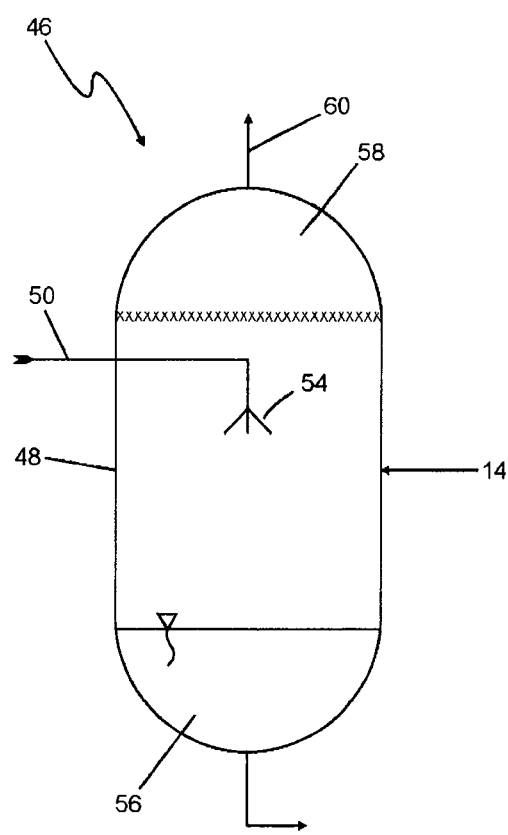
FIG. 5 a second variant according to the invention for separating volatile components contained in the steam.

FIG. 5 shows as a further possible variant of the method step 18 according to the invention for separation of volatile components from the gas phase 14. Illustrated is a method-technological apparatus 46 for scrubbing gas. It comprises a cylinder-shaped container 48. The gas phase 14 is added and is distributed uniformly within the container 48 by the inserts not illustrated in detail in the Figure. A scrubbing liquid 50, for example, sulfuric acid is added in counter flow and is finely distributed with appropriate constructive measures, for example, a nozzle 54. Alternatively, the gas phase 14 can also be directly introduced into the scrubbing liquid 50. By repeated mixing and separation processes of the gas phase 14 with the scrubbing liquid 50 with formation of a phase equilibrium the liquid components of the gas phase 14 react with the scrubbing liquid 50. The reaction product, comprised of ammonium sulfate, collects in a sump 56 of the container 48 and can be removed therefrom. At the head 58 of the container 48 the purified gas stream 60 exits from the apparatus 46.

Figure 6:
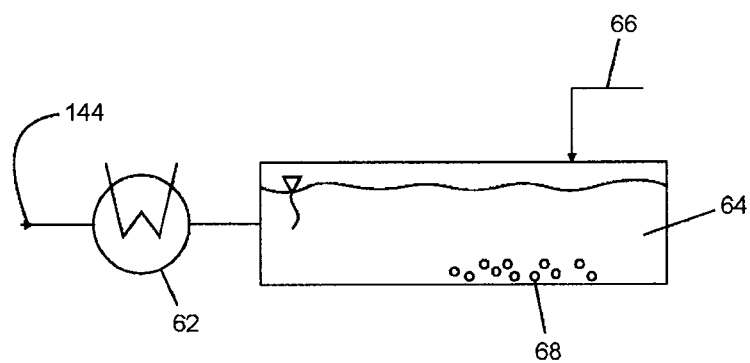
FIG. 6 a third variant according to the invention for separating the volatile components contained in the steam.

Another alternative variant of the method step 18 according to the invention, illustrated in FIG. 6, provides that the gas phase 14 by means of a suitable device 62 is condensed and subsequently the volatile components dissolved in the liquid phase 64 are crystallized by addition of suitable ions. In one embodiment the liquid component is ammonia that with addition 66 of phosphorus and magnesium salts reacts to magnesium ammonium phosphate. The salt that is produced by chemical reaction can be separated as a solid material 68 by conventional mechanical methods from the liquid phase 64.

At the end of the method according to the invention and all of the afore described pre-treatment and after-treatment variants, dry solid material 16, volatile components, in gaseous or, as a reaction product, in solid form, as well as distilled water originating from the drying steam and the moisture of the solid material are each present separated from each other.

Basically, the method according to the invention is suitable for recovery of all volatile components which by superheated steam will pass into the gas phase 14 and can be separated therefrom by suitable thermal, chemical or mechanical methods.

What is claimed is:

1. A method comprising the steps of:
    removing a liquid phase mechanically from a solid material of organic origin, wherein the solid material of organic origin is selected from the group consisting of manure, dung, digestates, and sewage sludge;
    subsequently drying the solid material by exposing the solid material to superheated steam circulating in a closed circuit;
    removing from the closed circuit excess steam that contains ammonia given off by the solid material;
    separating the ammonia from the excess steam by condensing the excess steam to a condensed phase and recovering the ammonia from the condensed phase by adding suitable ions to the condensed phase to crystallize the ammonia from the condensed phase.

2. The method according to claim 1, wherein the solid material of organic origin is subjected to a biological pretreatment prior to drying.

3. The method according to claim 2, wherein the biological pretreatment is anaerobic.

* * * * *